United States Patent
Thodupunoori et al.

(10) Patent No.: US 8,619,799 B1
(45) Date of Patent: Dec. 31, 2013

(54) METHODS AND APPARATUS FOR IMPROVING IDLE MODE PERFORMANCE USING DEEP PACKET INSPECTION (DPI) IDLE MODE AGENT

(75) Inventors: Santhosh Kumar Thodupunoori, San Jose, CA (US); Pawan Uberoy, San Jose, CA (US)

(73) Assignee: WiChorus, Inc., Naperville, IL (US)

( * ) Notice: Subject to any disclaimer, the term of this patent is extended or adjusted under 35 U.S.C. 154(b) by 244 days.

(21) Appl. No.: 13/287,888

(22) Filed: Nov. 2, 2011

(51) Int. Cl.
*H04L 12/28* (2006.01)

(52) U.S. Cl.
USPC ............ 370/401; 370/362; 370/392; 370/338

(58) Field of Classification Search
None
See application file for complete search history.

(56) References Cited

U.S. PATENT DOCUMENTS

| | | | |
|---|---|---|---|
| 2010/0195576 A1* | 8/2010 | Kong et al. | 370/328 |
| 2010/0316045 A1* | 12/2010 | Przybysz et al. | 370/352 |
| 2011/0310804 A1* | 12/2011 | Beygzadeh | 370/328 |
| 2013/0047034 A1* | 2/2013 | Salomon et al. | 714/18 |

* cited by examiner

*Primary Examiner* — Duc C Ho
(74) *Attorney, Agent, or Firm* — James M. Wu; JW Law Group (57) ABSTRACT

A network configuration capable of prioritizing and categorizing paging messages using a deep packet inspection ("DPI") idle mode agent ("IMA") is disclosed. Upon receiving downstream traffic addressing to end user ("EU") equipment in a communication network, the process, in one embodiment, is able to identify forwarding action by comparing the downstream traffic with content of predefined list of a forwarding table. The downstream traffic is directed to an inline DPI agent or DPI IMA if the EU equipment is in idle mode in accordance with comparison between the downstream traffic and the forwarding table. The process categorizes the downstream traffic to a high priority paging category when the downstream traffic matches with one of legitimate push applications stored in a list of legitimate push applications.

20 Claims, 5 Drawing Sheets

METHODS AND APPARATUS FOR IMPROVING IDLE MODE PERFORMANCE USING DEEP PACKET INSPECTION (DPI) IDLE MODE AGENT

FIELD

The exemplary embodiment(s) of the present invention relates to communications network. More specifically, the exemplary embodiment(s) of the present invention relates to paging activities.

BACKGROUND

With rapid growth of mobile data transfer over a high-speed communication network such as 3G or 4G cellular services, managing and controlling such data transfer become increasingly difficult and complicated. A conventional network layout includes Internet, LAN (local area network), and wireless networks that include hundreds of network devices such as access switches, routers, and bridges for facilitating data delivery from source devices to destination devices. Transferring massive amount of data efficiently between wireless portable devices such as smart phones and laptops over a typical and/or standard network becomes increasingly challenging.

In typical mobile wireless networks, subscriber devices or end user ("EU") equipments enter idle mode or idle state to conserve power. When downstream data arrives for a mobile which is in an idle state, a conventional gateway typically pages the mobile to wake up the mobile from the idle mode before it can receive the downstream data. In a high speed network environment, however, such paging process can result in high signaling load bursts. Bursts of paging messages can consume network resources and negatively impact overall network performance.

To maintain a gateway or network properly functioning during highly loaded conditions such as bursts of paging messages, a conventional approach provides rate limiting of paging messages which limits the amount of paging triggers, messages, and/or other activities that can be broadcasted at any given time. Although the conventional approach of rate limiting can alleviate signaling stress over the network, the network is nevertheless sluggish partially due to the drawback of crude rate limiting without any knowledge of nature of the paging activities.

SUMMARY

A communications network is configured to prioritize and/or categorize various paging messages using a deep packet inspection ("DPI") idle mode agent ("IMA") or DPI agent. Upon receiving downstream traffic addressing to end user ("EU") equipment in a communication network, the process, in one embodiment, is able to identify forwarding action by comparing the downstream traffic with the content of pre-defined list of a forwarding table. The downstream traffic is subsequently directed to an inline DPI agent or DPI IMA if the EU equipment is in idle mode in accordance with the result of comparison between the downstream traffic and the forwarding table. The downstream traffic is categorized to a high priority paging category when the downstream traffic matches with one of the legitimate push applications stored in the list of legitimate push applications. Alternatively, the downstream traffic is categorized to a low priority paging category when the downstream traffic fails to match any of the legitimate push applications in the list.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of employing deep packet inspection ("DPI") idle mode agent ("IMA") or agent to improve paging efficiency during idle modes.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

An embodiment(s) of the present invention discloses a method and/or a network apparatus capable of prioritize and/or categorize various paging messages using a DPI IMA or DPI agent to optimize paging activities. Upon receiving downstream traffic addressing to end user ("EU") equipment in a communication network, the process, in one embodiment, is able to identify forwarding action by comparing the downstream traffic with the content of predefined list of a forwarding table. The downstream traffic is subsequently directed to an inline DPI agent or DPI IMA if the EU equipment is in idle mode in accordance with comparison between the downstream traffic and the forwarding table. The downstream traffic is categorized to a high priority paging category when the downstream traffic matches with one of legitimate push applications stored in a list of legitimate push applications. Alternatively, the downstream traffic is categorized to a low priority paging category when the downstream traffic fails to match any of the legitimate push applications in the list.

Figure 1:
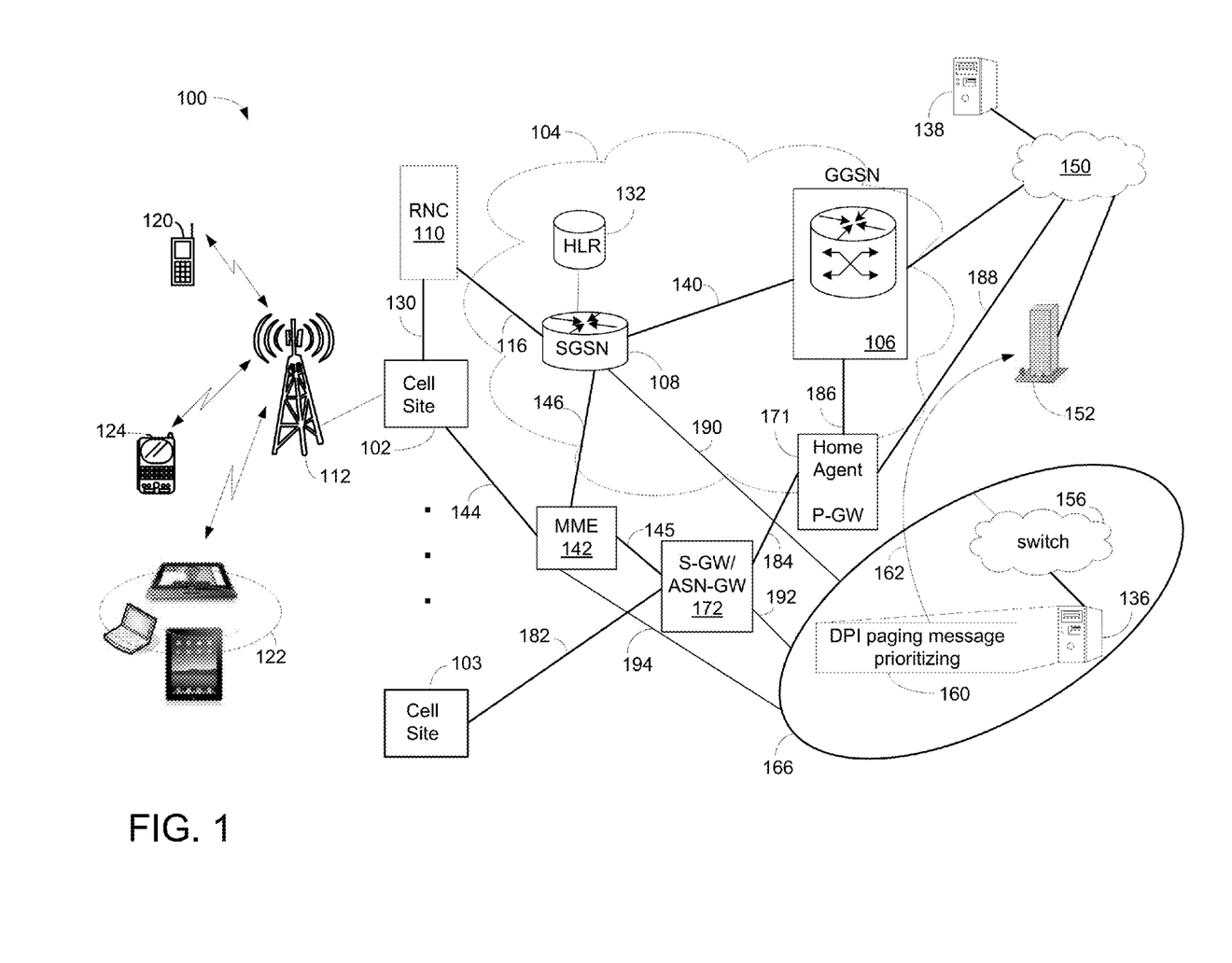
FIG. 1 is a block diagram illustrating a network configuration having one or more network devices configured to prioritize paging messages using DPI IMA in accordance with one embodiment of the present invention.

FIG. 1 is a block diagram 100 illustrating a network configuration having one or more network devices configured to optimize paging activities using DPI IMA in accordance with one embodiment of the present invention. Diagram 100 illustrates cell sites 102-103, switching network 104, network nodes 106-108, mobility management entity ("MME") 142, radio network controller ("RNC") 110, serving gateway ("S-GW") 172, and packet data network gateway ("P-GW") or HomeAgent 171. Node 106 is further coupled to Internet, wide area network ("WAN"), or virtual private network ("VPN") 150. Internet, WAN, or VPN provides network communication between node 106 and network devices such as server 138 and service provider(s) or subscription partner 152. Subscription or service provider 152, in one aspect, is a wireless carrier responsible for monitoring and managing user subscriptions. Server 138 may be a remote network server capable of providing network policy and/or paging activity management. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), fourth generation ("4G"), LTE (long term evolution), or combination of 3G and 4G cellular network configuration. MME 142, in one aspect, is coupled to cell site 102 and S-GW 172 via connections 144-145 and facilitates data transfer between 3G and LTE or between 2G and LTE (or 4G). In LTE (or 4G) network environment, MME 142 performs various controlling/managing functions, such as UE (user equipment) idle mode for tracking, paging, and retransmitting activities. MME 142 also provides network security management as well as resource allocations. To access packet based and/or IP based networks, MME 142, in one aspect, is able to reach other networks such as Ethernet and/or Internet via S-GW 172 and P-GW 171.

S-GW 172, in one example, is coupled to MME 142 and cell site 103 via connections 145 and 182, and is capable of routing data packets from cell site 103 (eNodeB) or MME 142 or P-GW 171 via connections 145 and 184. Note that S-GW 172 can couple to additional network elements such as additional MMEs and/or base stations. In an evolved packet core ("EPC") network environment, S-GW 172 can also be used to perform an anchoring function for mobility between 3G and 4G equipments. S-GW 172, in one aspect, performs various network management functions, such as terminating paths, paging idling UEs, storing data, routing information, generating replica, and the like.

P-GW 171, which is also known as HomeAgent, is coupled to S-GW 172, GGSN 106, and Internet 150 via connections 184-188, wherein P-GW 171 is able to provide network communication between an UE and IP based networks such as Internet 150. P-GW 171 is used for connectivity, packet filtering, inspection, data usage, billing, or PCRF (policy and charging rules function) enforcement, et cetera. P-GW 171 also provides an anchoring function for mobility between 3G and 4G (or LTE) packet core network(s). Note that P-GW 171 could be merged into GGSN 106 as a single NE or node.

Alternatively, P-GW 171 is able to directly route data between UEs via Internet 150.

Switching network 104 may be referred to as packet core network and cell sites 102-103 may be referred to as radio access networks. It should be noted that a different network architecture or configuration may be implemented for 3G, 4G, or 5G cellular networks with different layout of network elements, and/or differently named network elements, but the underlying concept of exemplary embodiment would not change. Switching network 104, in one aspect, includes IP and/or Multi Protocol Label Switching ("MPLS") based network capable of operating at a layer of Open Systems Interconnection Basic Reference Model ("OSI model") for information transfer between clients and network servers. Referring back to FIG. 1, network 104, including network nodes 106-108, a home location register ("HLR") 132, is able to route packet traffic between cell sites 102-103 and Internet 150. For example, node 108 transmits information between cell site 102 and HLR 132 via connections 116 and 130. Node 106 transmits information to (and receives information from) cell site 102 via connections 140, 116, and 130.

Node 106 is a gateway GPRS support node ("GGSN") wherein GPRS is a general packet radio service. GGSN 106 includes one or more routers or switches capable of managing, monitoring, and routing network traffic or network flows between sources and destinations. Network flow or packet flow, in one example, is a network access initiated by a subscriber and/or a user. Network node or GGSN 106, hereinafter referred to as GGSN, can also be a router, Access Service Network Gateway ("ASN-GW"), Packet Data Network Gateway ("PDN-GW"), serving gateway, switch, hub, or a combination of router, Access Service Network Gateway, P-GW, S-GW, switch, and/or hub.

Node 108 is a serving GPRS support node ("SGSN") configured to authenticate portable wireless UEs, registering mobile devices, collecting network usage information for billing, et cetera. While SGSN 108 tracks and/or controls mobile communication, GGSN 106 inspects and routes information and/or packet traffic between mobile terminal(s) and intended destination(s). Alternatively, SGSN 108 is connected to MME 142 which is also able to route packet streams to/from LTE network. Note that SGSN 108 can include MME functions. It should be noted that node 108 can be SGSN, MME, and/or a combination of SGSN and MME.

RNC 110 may be coupled to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling NEs in UMTS (universal mobile telecommunications system) radio access network ("UTRAN") and base stations that are connected to it.

Cell site 102, also known as base station, node B, or eNodeB, includes a radio tower 112. Radio tower 112 is further coupled to various UEs, such as a cellular phone 120, a handheld device 124, tablets and/or iPad® 122 via wireless communications. Handheld device 124 can be a smart phone, such as iPhone®, BlackBerry®, Android®, and so on. Cell site 102 facilitates network communication between mobile devices such as handheld device 124 and iPad® 122 via radio tower 112. It should be noted that cell site 102 may include additional radio towers as well as other land switching circuitry.

Mobile networks are classified into two parts, namely a radio access part such as cell site 102 and core network part such as network 104. The packet core network, which may include a gateway node (SGSN, GGSN), S-GW, P-GW, or the like, allocates the IP address to the mobile device enabling the allocated mobile device to communicate with the global IP. In one example, GGSN acts as a router and the IP address is allocated by a DNS server. GGSN provides a tunnel to the mobile user. In one aspect, the core network or packet core gateway includes accounting and authorization components, such as billing, charging, subscribing, tracking, authorizing, performance, usage, and the like.

The radio access network includes a radio base station such as cell site 102 and a controller. The controller can be located physically within a base station node or a gateway node. In one example, the radio network controller and the base station constitute the radio access network. The core network or a gateway node connects to a radio access network to communicate with the IP network. The gateway node is a gateway for IP access of wireless networks.

Referring back to FIG. 1, diagram 100 further includes a DPI IMA or DPI agent 166 employed to optimize paging activity by prioritizing and/or categorizing paging messages. DPI IMA 166, in one embodiment, includes server 136 having a paging message prioritizing module 160, wherein server 136 is coupled to S-GW 172 via an internal network 156. Alternatively, server 136 can directly couple to S-GW 172 without internal network 156. It should be noted that DPI IMA 166 can be hardware, firmware, software, or a combination of hardware, firmware, and software. The modules and/or components of DPI IMA 166 may be placed and/or implemented in a single device or in a multiple network elements such as server 136, S-GW 172, MME 142, SGSN 108, and/or ASN-GW. Depending on the network applications, DPI IMA 166 can be optionally coupled to SGSN 108 via connection 190, S-GW 172 via connection 192, and/or MME 142 via connection 194.

It should be noted that, in 2G/3G network environment, paging activity is handled or originated at SGSN 108, while in WiMAX (4G) network environment, paging activity is handled and/or originated at ASN-GW. Also, in LTE (4G) network environment, paging activity may be handled by S-GW and/or MME. Depending on the applications, DPI IMA 166 can be implemented in ASN-GW, SGSN, S-GW, or MME, or a combination of ASN-GW, SGSN, S-GW, and MME, hereinafter referred to as ASN-GW/SGSN/S-GW/MME.

ASN-GW/SGSN/S-GW/MME may include DPI IMA 166 which is used to monitor, prioritize, and/or categorize received downstream push data or downstream traffic that flows through the network in accordance with predefined specifications. For example, SGSN 108 or MME 142 may be configured to communicate between DPI IMA 166 and service provider or network operator 152 whereby paging status report(s) can be transmitted and/or distributed. A function of ASN-GW/SGSN/S-GW/MME, in one embodiment, is to detect and acknowledge idling EU devices such as smart phone 124 is in idle mode.

Upon detecting and receiving downstream traffic or downstream push data such as push mail for an idling UE equipment, DPI IMA 166 prioritizes paging messages and categorizing the paging messages based on the downstream traffic and a list of predefined legitimate push applications. After generating paging message(s) in accordance with the downstream traffic, the paging message(s) is categorized to different priority paging categories or priority queues depending on the result of comparison between the downstream traffic and the list of legitimate push applications. The prioritizing scheme, in one aspect, determines the time paging messages will be broadcasted and the number of paging messages will be broadcasted. For example, a high priority paging message may be broadcasted immediately with maximum number of duplicated paging messages across multiple paging groups. Each paging group, for example, may include 30 to 100 cellular towers spreading across one or more base stations or cell sites. Alternatively, a low priority paging message in a low priority paging category may need to wait in the queue before it is being broadcasted with limited or small number of duplicated paging messages.

An advantage of employing DPI IMA 166 is to improve network and/or subscriber idle mode performance in 3G/4G wireless networks for legitimate push applications. It should be noted that legitimate push applications, in one aspect, include instant messaging ("IM"), push email, social networking, gaming applications, et cetera.

Figure 2:
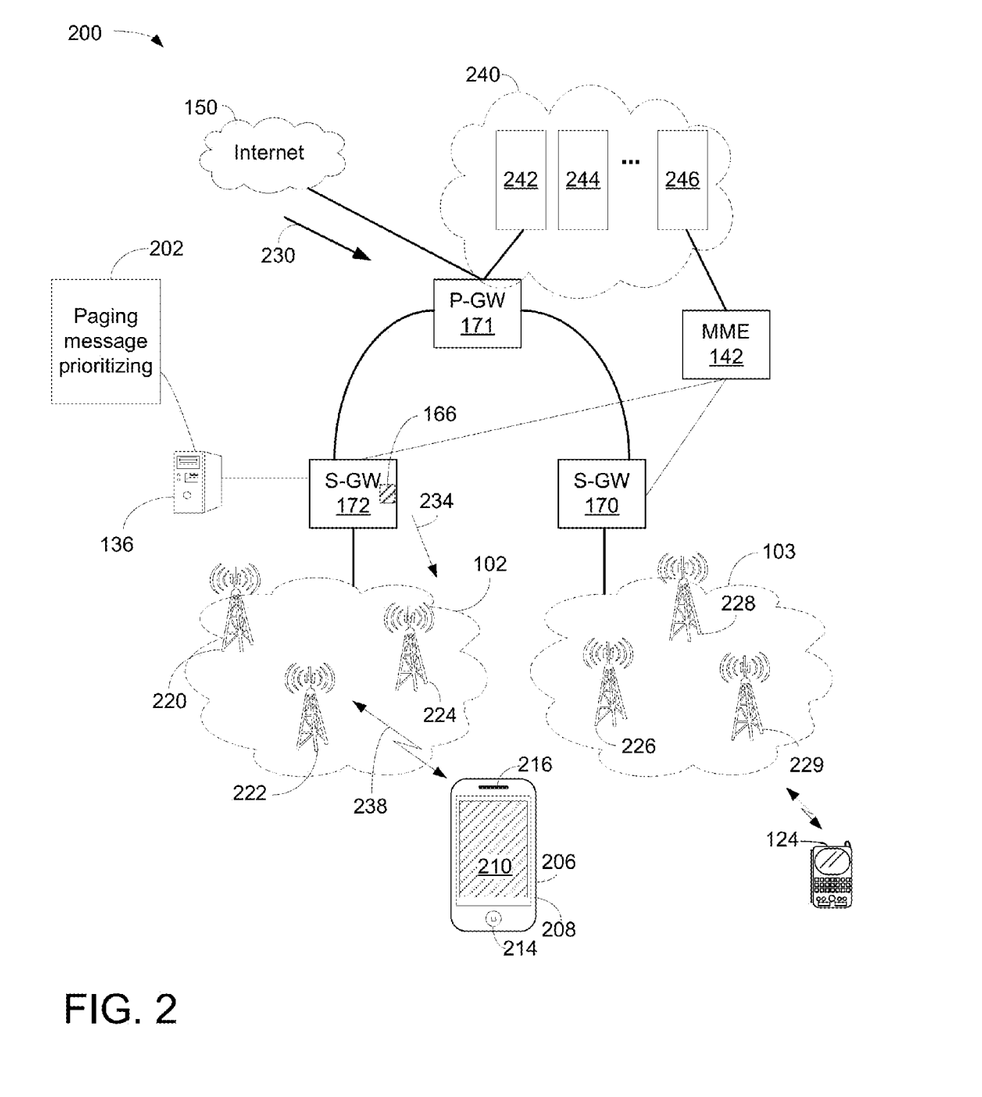
FIG. 2 is a block diagram illustrating an alternative network layout using DPI IMA to optimize paging activity using prioritizing and/or categorizing paging messages in accordance with one embodiment of the present invention.

FIG. 2 is a block diagram 200 illustrating an alternative network layout using DPI IMA to optimize paging activity using prioritizing and/or categorizing paging messages in accordance with one embodiment of the present invention. Diagram 200 includes P-GW 171, two S-GWs 170-172, two cell sites (or base stations) 102-103, server 136, and Internet 150. P-GW 171 includes a component 240 containing multiple modules, such as billing module 242, subscribing module 244, tracking module 246, and the like, for tracking routing activities between source nodes and destination nodes. It should be noted that the underlying concept of the exemplary embodiment(s) of the present invention would not change if one or more blocks (or devices) were added to or removed from diagram 200.

Cell site 102 includes multiple radio towers such as towers 220-224 which can also be referred to as a paging group, and is able to facilitate communication between mobile device 206 and P-GW 171 via S-GW 172. Similarly, cell site 103 includes multiple radio towers such as towers 226-229 which can also be referred to as a second paging group, and is able to facilitate communication between mobile device 124 and P-GW 171 via S-GW 170. S-GWs 170-172, in one example, couple to MME 143 to provide communications with different networks. It should be noted that the network layout shown in diagram 200 can be replaced by an alternative network such as 3GPP (3rd Generation Partnership Project) LTE based mobile broadband communications network.

S-GW 170 or 172, which is also known as packet core gateway, includes DPI IMA 166 capable of optimizing paging activity for one or more idling wireless devices. DPI IMA 166, which may reside in server 136, is configured to prioritize paging messages based on a list of legitimate push applications stored in server 136. DPI IMA 166 can be hardware, software, or a combination of hardware and software, and is able to search and compare downstream traffic with the content of the list of legitimate push applications stored in a local memory. Depending on the result of comparison, paging message(s) associated with the downstream traffic is prioritized. The subsequent broadcasting of paging messages is based on the priority of paging messages. It should be noted that DPI IMA 166 may be situated in S-GWs 170-172, MME 142, SGSN 108 or a combination of S-GWs 170-172, MME 142, and SGSN 108.

Mobile device 206, in one example, includes is a wireless handheld device having a screen 208, button 214, and speaker 216, wherein screen 208 displays a mobile application 210. Mobile device 206 can be a portable wireless UE, such as a smart phone, a laptop, a tablet, and the like, and is connected to a cellular radio network such as radio tower 222 for communicating with P-GW 171 for wireless services. When mobile device 206 is not in use, it may switch from active mode to idle mode for power conservation. While in the idle mode or sleeping mode, mobile device 206, for example, switches off all non-essential functions such as screen 208, radio transmission chip, and input/output ("I/O") interfaces, and leaves essential functions active such as scanning. One essential function may be the scanner which periodically scans or listens to the broadcast paging channel to check if there is any new message(s). It should be noted that the terms "idle mode," "idle state," and "sleeping mode" mean the same or substantially the same, and they can be used interchangeably.

When a packet core gateway or ASN-GW/SGSN/S-GW/MME detects a mobile such as mobile device 206 in idling mode and periodically scans broadcast paging channel for new messages, S-GW 172, in one aspect, forwards or punts downstream traffic to DPI IMA 166 when it detects the downstream traffic is for device 206. Upon generating paging message(s) in accordance with the downstream traffic, DPI IMA 166 prioritizes and/or categorizes the paging message(s) based on the list of legitimate push applications. It should be noted that the list of legitimate push applications can be stored locally or remotely. The paging message(s) is subsequently broadcasted 234 to device 206 via a paging group such as cell site 102 in accordance with the categorization or prioritization.

In one embodiment, S-GW 170 or 172, which includes a paging priority module or DPI IMA 166, is configured to optimize paging activity by categorizing paging messages into different prioritized queues. A high priority queue, in one embodiment, is able to hold large number of highly prioritized paging messages which will be broadcasted on a timely basis according to a predefined time frame. For example, if a total of 1000 paging messages will be broadcasted to a paging group such as cell site 102 at any given time, S-GW 172 may retrieve 900 paging messages from the high priority queue and fetch 100 paging messages from a low priority queue. As such, the paging messages in the low priority queue may not be broadcasted at the next broadcasting period because of its limited quota while the paging messages in the high priority queue is likely to be broadcasted at the next broadcasting period because of its high quota.

Depending on the applications, DPI IMA 166 may employ more than two prioritized queues, such as high, medium, and low priority queues. As such, the paging messages being categorized or queued in the high priority will be broadcasted almost immediately while the paging messages being categorized to the low priority may need to wait in the queue for a while. Note that network operator can adjust the limit of quota for each prioritized category depending on the applications.

Server 136, in one aspect, can be part of S-GW 172 capable of storing the list of legitimate push applications. It should be noted that the list of legitimate push applications may be periodically updated and/or revised. In one embodiment, server 136 includes a paging message prioritizing module 202 capable of performing at least a portion of DPI IMA functions. Alternatively, server 136 is also coupled to S-GW 170 and MME 142 to provide paging message categorization. It should be noted that DPI IMA 166 provides intelligent rate limiting of paging activity wherein the paging messages relating to legitimate push applications is less restricted or rate limited, while the paging messages relating to non-legitimate push traffic is rate limited. As a result, the end user should have an improved network service for legitimate push traffic during periods of high paging triggers.

An advantage of using DPI IMA or DPI agent is to improve network response time for popular push applications, such as IM, Presence, Email, Social networking, and gaming applications.

Figure 3:
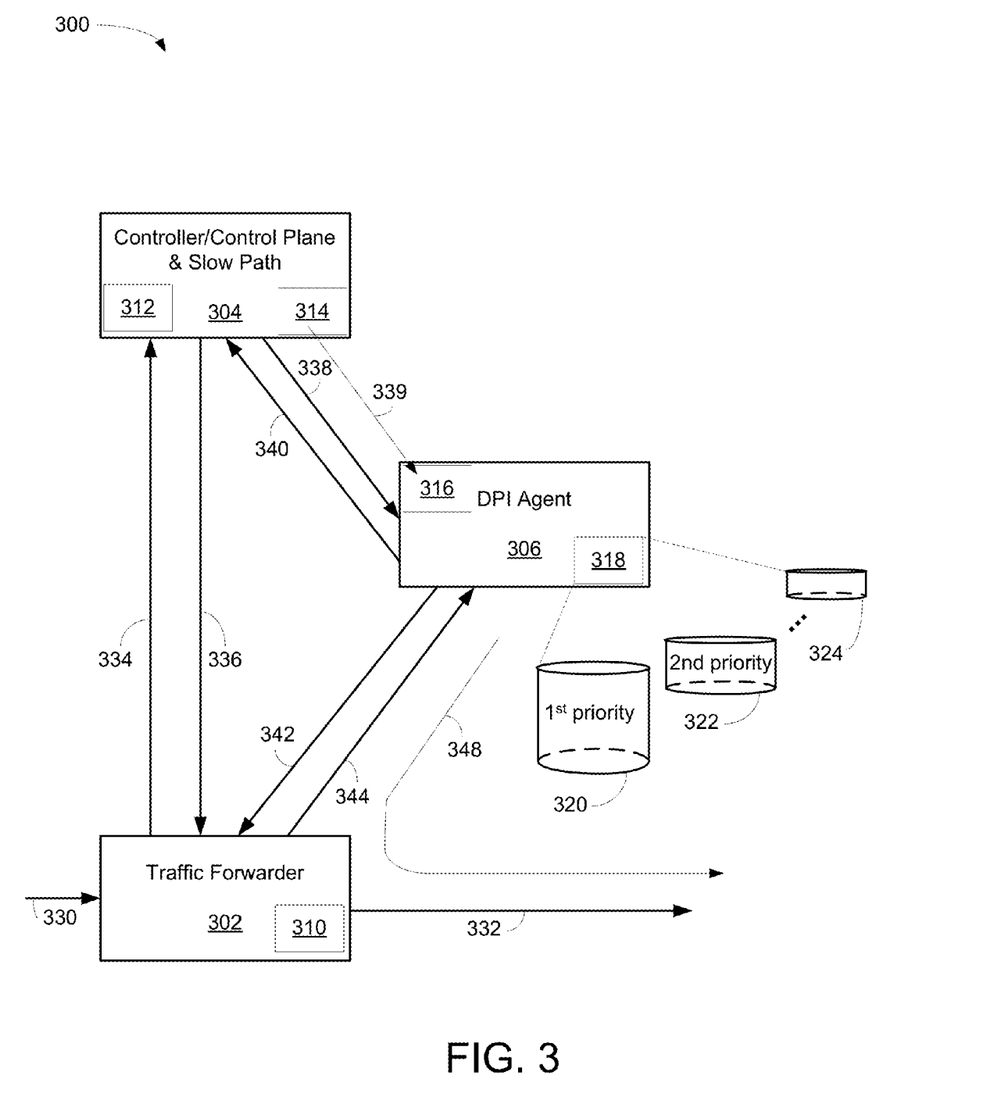
FIG. 3 is a simplified block diagram illustrating a network layout capable of prioritizing and categorizing using DPI agent in accordance with one embodiment of the present invention.

FIG. 3 is a simplified block diagram 300 illustrating a network layout capable of prioritizing and categorizing using DPI agent in accordance with one embodiment of the present invention. Diagram 300 includes a traffic forwarder 302, a Controller (Management, Control Plane & SlowPath) 304, and a DPI agent or DPI IMA 306, wherein DPI agent 306 further includes multiple priority queues 320-324. Traffic forwarder 302, Controller (Management, Control Plane & SlowPath) 304, and DPI agent 306 are coupled by connections 334-344. Note that Controller 304 is also known as Management, Control Plane, and/or SlowPath, hereinafter referred to as Controller (Management, Control Plane & SlowPath). It should be noted that the underlying concept of the exemplary embodiment(s) of the present invention would not change if one or more blocks (or devices) were added to or removed from diagram 300.

Traffic forwarder 302, also known as fast plane, includes a traffic forwarding table 310 and is able to receive downstream traffic 330 containing destination address. In one embodiment, traffic forwarding table 310 includes information relating to currently idling mobiles or idling wireless handheld devices over the network. For example, upon receipt of downstream traffic 330, traffic forwarder 302 having a comparator compares destination of downstream traffic 330 against the content of traffic forwarding table 310 to determine whether the destination device such as a mobile is in idle mode. When the destination device is in idle mode according to traffic forwarding table 310, downstream traffic 330 is forwarded or punted to DPI agent 306. Otherwise, downstream traffic 330 is forwarded via a fast path 332.

Controller (Management, Control Plane & SlowPath) 304, also known as signaling and manageability plane, is coupled to traffic forwarder 304 via connections 334-336, and is configured to generate and maintain a table 314 containing a list of legitimate push applications. In one embodiment, Controller (Management, Control Plane & SlowPath) 304 further includes a paging message formatting module capable of providing and/or disseminating one or more packet formats for paging messages in accordance with configuration policy. For example, Controller (Management, Control Plane & SlowPath) 304 is responsible for disseminating the list of legitimate push applications and format of paging messages to DPI agent 306 via connections 338-339. In one aspect, Controller (Management, Control Plane & SlowPath) 304 controls and maintains traffic forwarding table 312 which is used to synchronize and/or update content of traffic forwarding table 310 in traffic forwarder 302.

DPI agent 306 is coupled to Controller (Management, Control Plane & SlowPath) 304 and traffic forwarder 302 via connections 338-344. After receiving incoming traffic from traffic forwarder 302 when the destination device indicated by the incoming traffic is in idle mode, DPI agent 306 is able to categorize incoming traffic to different prioritized paging categories based on the list of legitimate push applications 316. DPI agent 306, in one example, includes a high priority queue 320 capable of queuing paging messages with high priority wherein queued paging messages are subsequently broadcasted according to a predefined sequence. In addition, DPI agent 306 also includes a low priority queue 324 configured to queue paging messages with low priority. A predefined rated number of paging messages to be broadcasted from low priority queue 324 is lower than the number of paging messages to be broadcasted in the high priority queue. In one aspect, the rated number of paging messages to be broadcasted from low priority queue is about one (1) to thirty (30) percent of the number of paging messages to be broadcasted from high priority queue.

In one aspect, a packet stream 330 flows into fast plane or traffic forwarder 302 and packet stream 330 travels through fast plane 302 via past path 332 if the destination device addressed by packet stream 330 is in active mode. Traffic forwarder 302, in one embodiment, includes network processor(s) for handling and/or routing various packet flows according to traffic forwarding table 310. When a subscriber modem enters idle mode, the flows belonging to the idling subscriber are marked as "idle-punt-to-dpi-agent". Upon detecting the downstream traffic marked with "idle-punt-to-dpi-agent," traffic forwarder 302 sends the traffic to dpi-idle-mode agent or DPI agent 306 for further processing.

Controller (Management, Control Plane & SlowPath) 304 having a signaling and manageability module provides a list of legitimate push applications 314. The manageability plane or Controller (Management, Control Plane & SlowPath) 304 uses the list of legitimate push applications to direct downstream traffic including paging messages for idling subscribers. Once the administrator configures a list of legitimate push applications, such as email, Skype®, Google®-push notification service, apple-push-service, et cetera, manageable plane forwards the list of legitimate push applications to DPI agent 306. In an alternative embodiment, manageability plane or Controller (Management, Control Plane & SlowPath) 304 also disseminates paging topology information to DPI agent 306. Controller (Management, Control Plane & SlowPath) 304 is able to receive signaling traffic flows from traffic forwarder 302 or fast plane via connections 334-336. Signaling plane receives signaling traffic flows which are also known as manageability message flows between Controller (Management, Control Plane & SlowPath) or manageability plane 304 and fast plane 302 for programming or updating resources. While a packet flow 330 flows through traffic forwarder 302 via fast path 332, a packet flow that travels to Controller (Management, Control Plane & SlowPath) 304 via connections 334-336 may be considered as slow path traffic or exception traffic flows.

DPI agent 306, in one embodiment, maintains a list of valid push applications 316 as well as flow state information for applications detected for each subscriber. Once a subscriber enters idle mode, signaling plane informs DPI agent 306 that the subscriber is in idle mode. Upon receiving downstream data packets for the idling subscriber, DPI agent 306 uses information of application flow state to determine whether the downstream traffic triggering paging activity belongs to one of configured legitimate push applications. DPI agent 306, in one example, limits rate of flow for paging messages with non-legitimate triggers while allows higher rate of flow for paging messages with legitimate push applications. It should be noted that when multiple classes of push applications are provisioned, DPI agent 306 provides different rate limiting to different classes of paging triggers or messages.

DPI agent 306, in one embodiment, includes multiple priority queues 320-324 wherein higher priority queue(s) 320 allows more paging messages to be disseminated while low priority queue(s) 322 limits small amount of paging messages to be broadcasted. Accordingly, paging messages queued in a lower priority queue may not be broadcasted immediately. During an operation, upon receipt of downstream traffic from traffic forwarder 302 indicating an idling mobile, DPI agent 306 categorizes the downstream traffic according to a result of comparison between the downstream traffic and the list of legitimate push applications in table 316. Upon identifying the priority of downstream traffic, a paging message is generated and is prioritized based on the priority of downstream traffic. After the paging message(s) is prioritized and placed in one of priority queues 320-324, the paging message is subsequently broadcasted by inserting the paging message back to fast path as indicated by arrow 348. After paging announcement, DPI agent 306, in one embodiment, receives an acknowledgement from the subscriber or mobile indicating that it is in active mode. The downstream traffic is subsequently forwarded to the subscriber or mobile via fast path through connections 342-344.

It should be noted that DPI agent 306 is able to detect legitimate push applications and improve idle mode network performance in 3G/4G wireless networks. In one embodiment, DPI agent 306 which is an inline network device uses multiple classes or categories with different priority queues to analyze paging triggers and intelligent rate limiting of paging activity depending on predefined legitimate push applications.

Figure 4:
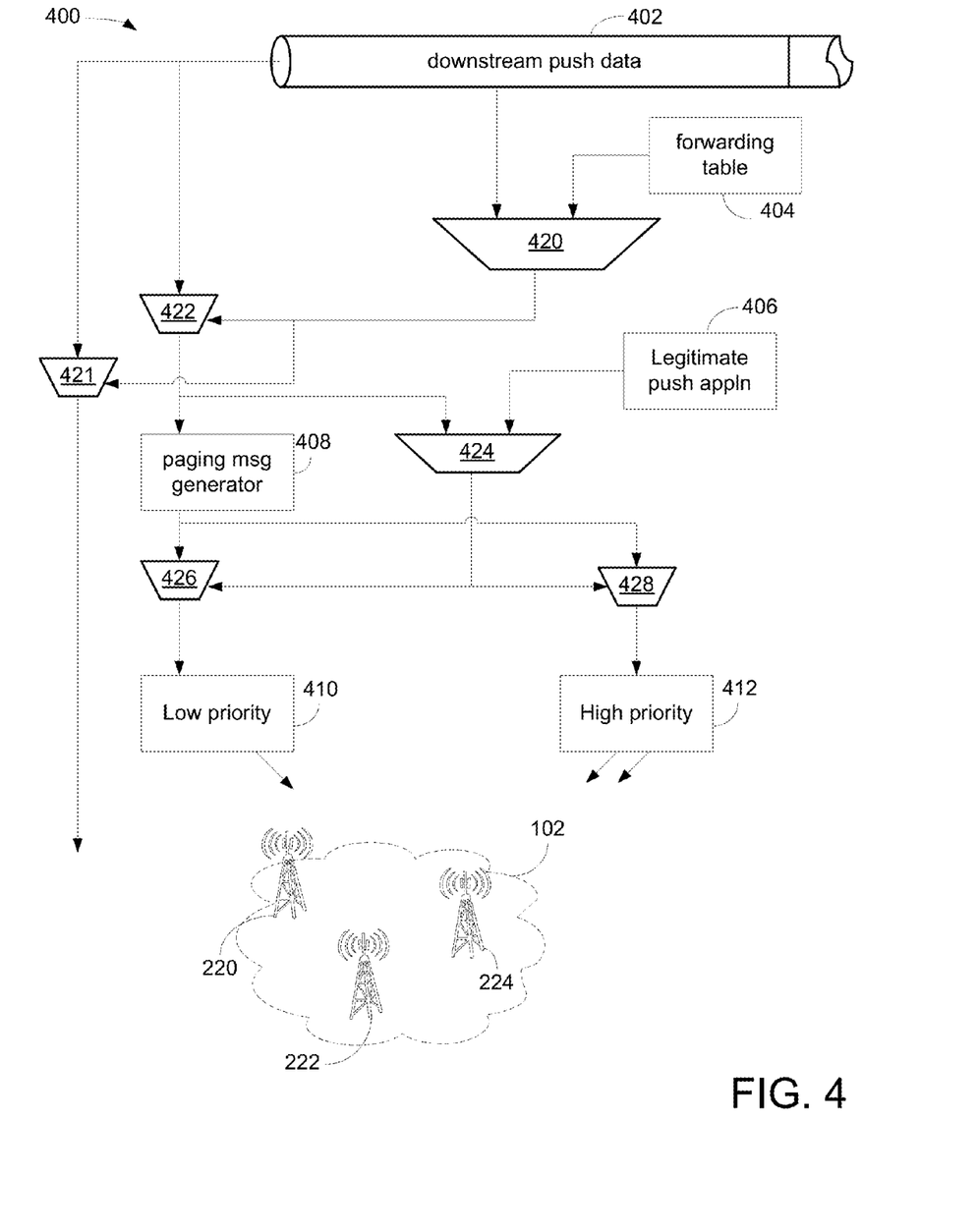
FIG. 4 is a logic flow diagram illustrating an exemplary process able to prioritize and/or categorize paging messages in accordance with one embodiment of the present invention.

FIG. 4 is a logic flow diagram 400 illustrating an exemplary process able to prioritize and/or categorize paging messages in accordance with one embodiment of the present invention. When a packet stream of downstream push data 402 arrives at DPI IMA, packet stream 402 is examined at comparator 420 to determine whether the destination device is in active or idling mode in accordance with the content of forwarding table 404. If no match has been found in forwarding table 404, packet stream 402 proceeds through the fast path via gate circuit 421. If a match has been found in forwarding table 404 which indicates that the subscriber or destination device is in idling mode, packet stream 402 proceeds to paging message generator 408 and comparator 424 via gate circuit 422.

Comparator 424 compares the content of packet stream 402 with the content of list of legitimate push applications 406 to identify whether packet stream 402 is a legitimate push application or a non-legitimate push application. If packet stream 402 is a legitimate push application, the paging message(s) generated by generator 408 proceeds to high priority queue 412 via gate circuit 428. Alternatively, packet stream 402 is categorized to low priority queue 410 via gate circuit 426. It should be noted that gate circuits 426-428 are controlled by the result of comparator 424. The paging message(s) is subsequently broadcasted to paging group or cell site 102 to wake up the idling destination or subscriber.

During an operation, upon identifying a forwarding action by comparing downstream traffic 402 with content of predefined list of a forwarding table 404, downstream traffic 402 is directed to an inline DPI agent if the destination EU equipment is in idle mode in accordance with the result of comparison. Downstream traffic 402 is categorized to a low priority paging category when downstream traffic 402 fails to match with any legitimate push applications listed on the list of legitimate push applications 406. After generating a paging announcement in accordance with the low priority paging category associated with downstream traffic 402, the paging announcement is forwarded to the EU equipment. After receiving an active signal from the EU equipment indicating the EU equipment is ready to receive wireless data, downstream traffic 402 is forwarded to the EU equipment. In one embodiment, a status report regarding the EU equipment is sent to a signaling and manageability module in network management controller. It should be noted that downstream traffic 402 could be a legitimate push application sending from a credible source addressing to a wireless handheld device. The credible sources, for example, include Yahoo­.com®, msn.com®, google.com®, aol.com®, et cetera.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
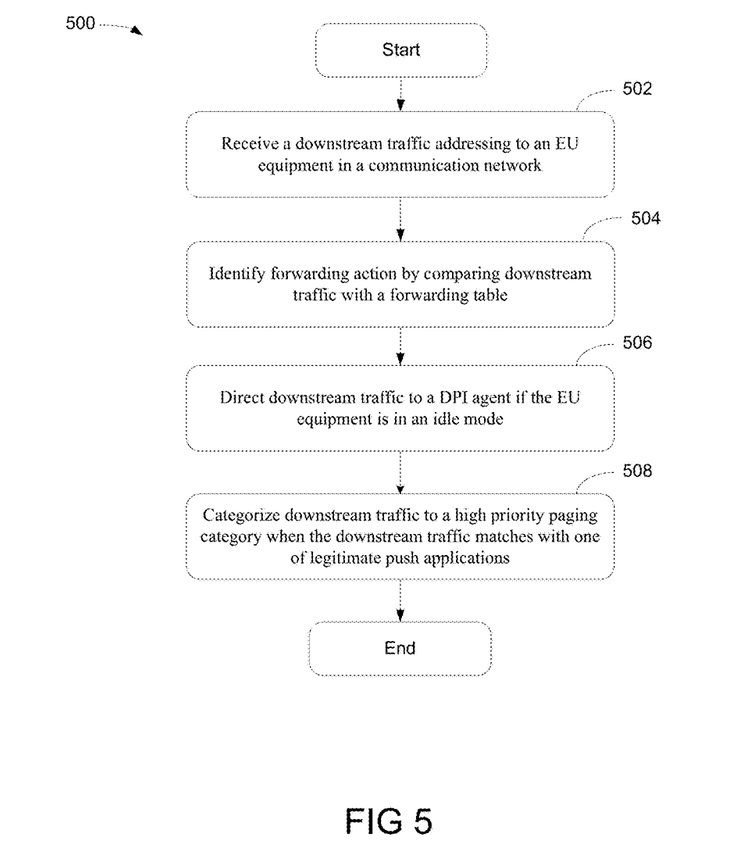
FIG. 5 is a flowchart illustrating an exemplary process of categorizing paging messages using DPI IMA or agent in accordance with one embodiment of the present invention.

FIG. 5 is a flowchart 500 illustrating an exemplary process of categorizing paging messages using DPI IMA or agent in accordance with one embodiment of the present invention. At block 502, a process capable of prioritizing paging messages is configured to receive downstream traffic addressing to first EU equipment in a communication network. For example, multiple packets transporting IM sent from a credible source to a wireless handheld device is detected and received. It should be noted that packets could carry other types of push data, such as email, gaming, presence, and social networking applications.

At block 504, the process identifies a forwarding action by comparing the downstream traffic with the content of predefined list of a forwarding table. For example, the process determines whether the first EU equipment is in idle mode or active mode according to the content of predefined list of forwarding table. The list of forwarding table, for instance, is updated periodically.

At block 506, the downstream traffic is directed to an inline DPI agent if the first EU equipment is in idle mode according to the result of comparison between the downstream traffic and the forwarding table. Inline DPI, in one example, indicates that DPI is situated in the data path. It should be noted that to implement DPI IMA, DPI does not have to be in the data path.

At block 508, the downstream traffic is categorized to a high priority paging category when the downstream traffic matches with one of the legitimate push applications stored in a list of legitimate push applications. In one embodiment, after generating a paging announcement in accordance with the high priority paging category associated with the downstream traffic, the paging announcement is forwarded to the first EU equipment. Upon receiving an active signal from the first EU equipment indicating the first EU equipment is in active mode, the downstream traffic is forwarded to the first EU equipment. In one aspect, a status report regarding the first EU equipment is sent to a signaling and manageability module of network management controller. The process sends the list of legitimate push applications from a signaling and manageability module of Controller (Management, Control Plane & SlowPath) to the inline DPI agent. In addition, upon receiving second downstream traffic addressing to second EU equipment, a second forwarding action is identified by comparing the second downstream traffic with the content of predefined list of the forwarding table. After directing the second downstream traffic to the inline DPI agent if the second EU equipment is in idle mode in accordance with the comparison between the second downstream traffic and the forwarding table, the process is capable of categorizing the second downstream traffic to a medium priority paging category when the second downstream traffic matches with one of legitimate push applications stored in the list of legitimate push applications.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for prioritizing paging messages in a communication network, comprising:
   receiving downstream traffic addressing to a first end user ("EU") equipment in a communication network;
   identifying a forwarding action by comparing the downstream traffic with content of predefined list of a forwarding table;
   directing the downstream traffic to a deep packet inspection ("DPI") agent if the first EU equipment is in idle mode in accordance with a result of comparison between the downstream traffic and the forwarding table; and
   categorizing the downstream traffic to a high priority paging category when the downstream traffic matches with one of legitimate push applications stored in a list of legitimate push applications.

2. The method of claim 1, further comprising:
   generating a paging announcement in accordance with the high priority paging category associated with the downstream traffic; and
   forwarding the paging announcement to the first EU equipment.

3. The method of claim 2, further comprising:
   receiving an active signal from the first EU equipment indicating the first EU equipment is in active mode; and
   forwarding the downstream traffic to the first EU equipment.

4. The method of claim 3, further comprising sending a status report regarding the first EU equipment to a network management controller.

5. The method of claim 1, further comprising sending the list of legitimate push applications from a signaling and manageability module to the DPI agent.

6. The method of claim 1, wherein receiving downstream traffic addressing to a first EU equipment includes receiving a plurality of packets transporting an instance message sent from a credible source addressing to a wireless handheld device.

7. The method of claim 1, wherein identifying forwarding action by comparing the downstream traffic with content of predefined list of forwarding table further includes identifying whether the first EU equipment is in idle mode according to the content of predefined list of forwarding table.

8. The method of claim 1, further comprising:
   receiving second downstream traffic addressing to a second EU equipment;
   identifying a second forwarding action by comparing the second downstream traffic with the content of predefined list of the forwarding table;
   directing the second downstream traffic to the inline DPI agent if the second EU equipment is in idle mode in accordance with comparison between the second downstream traffic and the forwarding table; and
   categorizing the second downstream traffic to a medium priority paging category when the second downstream traffic matches with one of legitimate push applications stored in the list of legitimate push applications.

9. A method for prioritizing paging messages in a communication network, comprising:
   receiving downstream traffic addressing to an end user ("EU") equipment in a communication network;
   identifying forwarding action by comparing the downstream traffic with content of predefined list of a forwarding table;
   directing the downstream traffic to an inline deep packet inspection ("DPI") agent if the first EU equipment is in idle mode in accordance with a result of comparison between the downstream traffic and the forwarding table; and
   categorizing the downstream traffic to a low priority paging category when the downstream traffic fails to match with any legitimate push applications stored in a list of legitimate push applications.

10. The method of claim 9, further comprising:
    generating a paging announcement in accordance with the low priority paging category associated with the downstream traffic; and
    forwarding the paging announcement to the EU equipment.

11. The method of claim 10, further comprising:
    receiving an active signal from the EU equipment indicating the EU equipment is ready to receive wireless data; and
    forwarding the downstream traffic to the EU equipment.

12. The method of claim 11, further comprising sending a status report regarding the EU equipment to a signaling and manageability module.

13. The method of claim 9, further comprising sending the list of legitimate push applications from a signaling and manageability module to the inline DPI agent.

14. The method of claim 9, wherein receiving downstream traffic addressing to an EU equipment includes receiving a plurality of packets transporting an email sent via a credible source addressing to a wireless handheld device.

15. The method of claim 9, wherein identifying forwarding action by comparing the downstream traffic with content of predefined list of forwarding table further includes identifying whether the EU equipment is in idle mode according to the content of predefined list of forwarding table.

16. A network system configured to categorize paging messages, comprising:
    a traffic forwarder having a traffic forwarding table operable to receive downstream traffic containing destination address;
    a controller coupled to the traffic forwarder and configured to generate a list of legitimate push applications; and
    a deep packet inspection ("DPI") agent coupled to the controller and configured to receive incoming traffic from the traffic forwarder when destination of the incoming traffic is in idle mode, wherein the DPI agent is able to categorize incoming traffic to different prioritized paging categories based on the list of legitimate push applications.

17. The system of claim 16, wherein the traffic forwarder includes a comparator configured to match the downstream traffic with content of the traffic forwarding table.

18. The system of claim 16, wherein the controller includes a paging message formatting module configured to provide paging message format in accordance with configuration policy.

19. The system of claim 16, wherein the DPI agent includes,
    a high priority queue configured to queue a plurality of paging messages with high priority and configured to broadcast a predefined large number of paging messages from the high priority queue; and
    a low priority queue configured to queue a plurality of paging messages with low priority and configured to broadcast a predefined small number of paging messages from the low priority queue.

20. The system of claim 10, wherein the predefined small number of paging messages is approximately ten (10) percent of the predefined large number of paging messages.

* * * * *